United States Patent
Ryu et al.

(10) Patent No.: US 12,284,713 B2
(45) Date of Patent: Apr. 22, 2025

(54) METHODS AND APPARATUSES FOR CONFIGURING DISCONTINUED RECEPTION IN SIDELINK COMMUNICATION

(71) Applicant: QUALCOMM Incorporated, San Diego, CA (US)

(72) Inventors: Jung Ho Ryu, Fort Lee, NJ (US); Sony Akkarakaran, Poway, CA (US); Qing Li, Princeton Junction, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 377 days.

(21) Appl. No.: 17/466,675

(22) Filed: Sep. 3, 2021

(65) Prior Publication Data

US 2023/0072971 A1    Mar. 9, 2023

(51) Int. Cl.
*H04W 76/28*    (2018.01)
*H04W 76/14*    (2018.01)
*H04W 92/18*    (2009.01)

(52) U.S. Cl.
CPC ........... *H04W 76/28* (2018.02); *H04W 76/14* (2018.02); *H04W 92/18* (2013.01)

(58) Field of Classification Search
CPC ..... H04W 76/28; H04W 76/14; H04W 92/18; H04W 52/0216
See application file for complete search history.

(56) References Cited

U.S. PATENT DOCUMENTS

| | | | |
|---|---|---|---|
| 2020/0052843 A1* | 2/2020 | Cheng | H04W 76/14 |
| 2022/0022279 A1* | 1/2022 | Kim | H04W 72/23 |
| 2022/0150730 A1* | 5/2022 | Freda | H04L 1/188 |
| 2022/0159679 A1* | 5/2022 | Park | H04W 4/46 |

(Continued)

FOREIGN PATENT DOCUMENTS

| | | |
|---|---|---|
| WO | 2021160495 A1 | 8/2021 |
| WO | 2021163527 A1 | 8/2021 |

OTHER PUBLICATIONS

Cintron F.J., et al., "Study of 5G New Radio (NR) Support for Direct Mode Communications", NISTIR 8372, National Institute of Standards and Technology (NIST), May 7, 2021, pp. 1-82, XP061068463, paragraph [3.2.1]—paragraph [04.4].

(Continued)

*Primary Examiner* — Steven Hieu D Nguyen
(74) *Attorney, Agent, or Firm* — ArentFox Schiff LLP

(57) ABSTRACT

Aspects of the present disclosure include methods, apparatuses, and computer readable media for transmitting a first message to a transmitting (TX) UE for discontinuous reception (DRX) by the RX UE for sidelink (SL) communication with the TX UE, wherein the first message includes a DRX configuration including, for each of one or more SL connections or one or more network connections, one or more of a cycle duration and start offset, a slot offset, an on duration length, an inactivity timer duration, or a maximum duration of active timer and a radio frequency (RF) capability of the RX UE including one or more of a number of simultaneous RF chains, a number of beams configured for DRX, angular separations of beams configured for DRX, or power leakage values.

24 Claims, 11 Drawing Sheets

(56) References Cited

U.S. PATENT DOCUMENTS

| | | | |
|---|---|---|---|
| 2023/0014303 A1* | 1/2023 | Di Girolamo | H04W 72/20 |
| 2023/0062341 A1* | 3/2023 | Zhou | H04W 76/28 |
| 2023/0082194 A1* | 3/2023 | Liu | H04W 76/28 |
| | | | 370/310 |
| 2023/0171843 A1* | 6/2023 | Luo | H04W 68/005 |
| | | | 370/310 |
| 2023/0239793 A1* | 7/2023 | Lin | H04W 52/0216 |
| | | | 370/311 |
| 2024/0172038 A1* | 5/2024 | Pateromichelakis | |
| | | | H04W 28/0268 |

OTHER PUBLICATIONS

International Search Report and Written Opinion—PCT/US2022/073675—ISA/EPO—Mar. 13, 2023.
Partial International Search Report—PCT/US2022/073675—ISA/EPO—Nov. 16, 2022.

\* cited by examiner

1100

1105

RECEIVE A FIRST MESSAGE FROM A RECEIVING (RX) UE FOR SIDELINK (SL) DISCONTINUOUS RECEPTION (DRX) BY THE RX UE FOR SL COMMUNICATION WITH THE TX UE, WHEREIN THE FIRST MESSAGE INCLUDES ONE OR MORE OF
- A DRX CONFIGURATION INCLUDING, FOR EACH OF ONE OR MORE SL CONNECTIONS WITH ONE OR MORE SL UES OR ONE OR MORE NETWORK CONNECTIONS WITH ONE OR MORE BAE STATIONS, ONE OR MORE OF A CYCLE DURATION AND START OFFSET, A SLOT OFFSET, AN ON DURATION LENGTH, AN INACTIVITY TIMER DURATION, OR A MAXIMUM DURATION OF ACTIVE TIMER OR
- A RADIO FREQUENCY (RF) CAPABILITY OF THE RX UE INCLUDING ONE OR MORE OF A NUMBER OF SIMULTANEOUS RF CHAINS, A NUMBER OF BEAMS CONFIGURED FOR DRX, ANGULAR SEPARATIONS OF BEAMS CONFIGURED FOR DRX, OR POWER LEAKAGE VALUES

1110

TRANSMIT, TO THE RX UE, A SECOND MESSAGE INCLUDING A RX UE DRX CONFIGURATION BASED ON AT LEAST ONE OF THE DRX CONFIGURATION OR THE RF CAPABILITY INDICATED IN THE FIRST MESSAGE

*FIG. 11*

METHODS AND APPARATUSES FOR CONFIGURING DISCONTINUED RECEPTION IN SIDELINK COMMUNICATION

BACKGROUND

Aspects of the present disclosure relate generally to wireless communications, and more particularly, to apparatuses and methods for configuring discontinued reception in sidelink communication.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which may be referred to as new radio (NR)) is envisaged to expand and support diverse usage scenarios and applications with respect to current mobile network generations. In an aspect, 5G communications technology may include: enhanced mobile broadband addressing human-centric use cases for access to multimedia content, services and data; ultra-reliable-low latency communications (URLLC) with certain specifications for latency and reliability; and massive machine type communications, which may allow a very large number of connected devices and transmission of a relatively low volume of non-delay-sensitive information. As the demand for mobile broadband access continues to increase, however, further improvements in NR communications technology and beyond may be desired.

In a wireless communication network, two or more user equipment (UEs) may communicate directly via a sidelink communication channel. In sidelink communication, the UEs exchange information without first transmitting the information to a base station (BS). However, in order to reduce cost and/or electrical power consumption, the UE may cycle between wake up periods and sleep periods. Further, the UE may allocate the radio frequency (RF) resources to communicate with only one target at a time (other UEs during sidelink communication or BSs during network communication). As such, it may be desirable for the UE to synchronize the communications with multiple targets to prevent delay or loss of messages caused by collisions between messages. Therefore, improvements may be desirable.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects of the present disclosure include methods by a user equipment (UE) for transmitting a first message to a transmitting (TX) UE for sidelink (SL) discontinuous reception (DRX) by the RX UE for SL communication with the TX UE, wherein the first message includes one or more of a DRX configuration including, for each of one or more SL connections with one or more SL UEs or one or more network connections with one or more base stations, one or more of a cycle duration and start offset, a slot offset, an on duration length, an inactivity timer duration, or a maximum duration of active timer or a radio frequency (RF) capability of the RX UE including one or more of a number of simultaneous RF chains, a number of beams configured for DRX, angular separations of beams configured for DRX, or power leakage values.

Other aspects of the present disclosure include a user equipment (UE) having a memory comprising instructions, a transceiver, and one or more processors operatively coupled with the memory and the transceiver, the one or more processors configured to execute instructions in the memory to transmit a first message to a transmitting (TX) UE for sidelink (SL) discontinuous reception (DRX) by the RX UE for SL communication with the TX UE, wherein the first message includes one or more of a DRX configuration including, for each of one or more SL connections with one or more SL UEs or one or more network connections with one or more base stations, one or more of a cycle duration and start offset, a slot offset, an on duration length, an inactivity timer duration, or a maximum duration of active timer or a radio frequency (RF) capability of the RX UE including one or more of a number of simultaneous RF chains, a number of beams configured for DRX, angular separations of beams configured for DRX, or power leakage values.

An aspect of the present disclosure includes a user equipment (UE) including means for transmitting a first message to a transmitting (TX) UE for sidelink (SL) discontinuous reception (DRX) by the RX UE for SL communication with the TX UE, wherein the first message includes one or more of a DRX configuration including, for each of one or more SL connections with one or more SL UEs or one or more network connections with one or more base stations, one or more of a cycle duration and start offset, a slot offset, an on duration length, an inactivity timer duration, or a maximum duration of active timer or a radio frequency (RF) capability of the RX UE including one or more of a number of simultaneous RF chains, a number of beams configured for DRX, angular separations of beams configured for DRX, or power leakage values.

Some aspects of the present disclosure include non-transitory computer readable media having instructions stored therein that, when executed by one or more processors of a user equipment (UE), cause the one or more processors to transmit a first message to a transmitting (TX) UE for sidelink (SL) discontinuous reception (DRX) by the RX UE for SL communication with the TX UE, wherein the first message includes one or more of a DRX configuration including, for each of one or more SL connections with one or more SL UEs or one or more network connections with one or more base stations, one or more of a cycle duration and start offset, a slot offset, an on duration length, an inactivity timer duration, or a maximum duration of active timer or a radio frequency (RF) capability of the RX UE including one or more of a number of simultaneous RF chains, a number of beams configured for DRX, angular separations of beams configured for DRX, or power leakage values.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 11 illustrates an example of a method for scheduling SL DRX according to aspects of the present disclosure.

DETAILED DESCRIPTION

Figure 1:
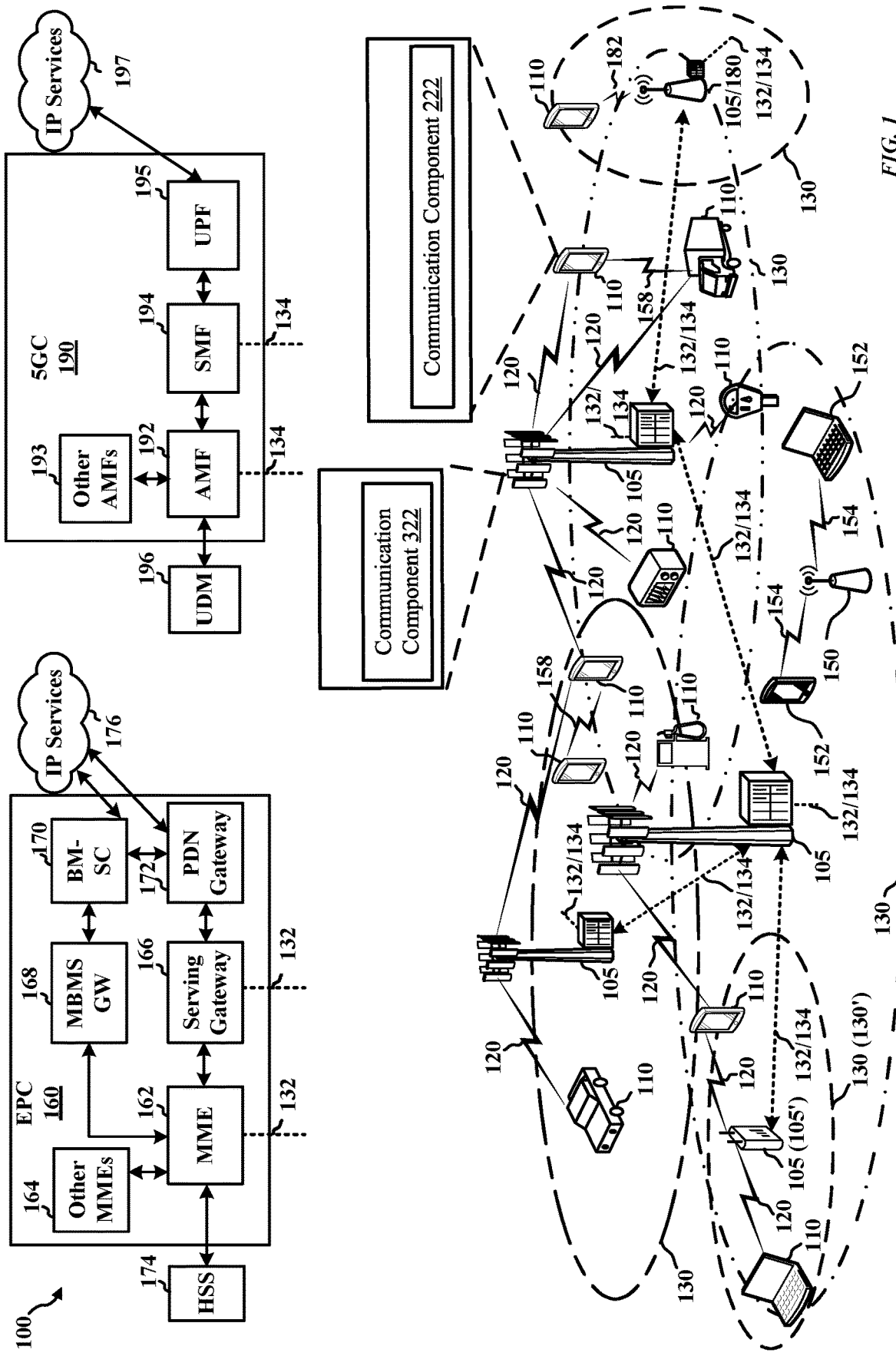
FIG. 1 is a diagram illustrating an example of a wireless communications system and an access network according to aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

In one aspect, a user equipment (UE) may operate in Connected mode Discontinuous Reception (C-DRX). The UE may operate in repeated cycles of wake up period (on duration or active time) and sleep period (inactive time). In Uu (network communication with a base station (BS)), the UE may monitor for control signals (such as downlink control information (DCI)) from a serving BS (e.g., a gNB) during the wake up period. The UE may turn off radio frequency (RF) components during the sleep period to save power, when the UE does not monitor for DCIs during the sleep period. The BS may configure the UE with DRX and knows when the UE is in the active states for monitoring for DCI. If a DCI is received from the BS, the UE may perform actions related to the received DCI, and return to the sleep period until the next wake up period.

In some aspects, a UE implementing sidelink (SL) communication with another UE may also operate in C-DRX mode. SL DRX (DRX for sidelink communication) configuration may be configured per unicast connection, i.e., per a pair of source and destination identifier (ID). For unicast, the UE may adopt per-direction DRX configuration as baseline. For SL DRX configuration of each direction where one UE (e.g., the transmitting (TX) UE) is communicating with the other UE (e.g., the receiving (RX) UE), the support signaling exchange may include both 1) Signaling-1: signaling from RX UE to TX UE, and 2) Signaling-2: signaling from TX UE to RX UE. In some aspects, for DRX configuration of each direction where one UE is the TX UE and the other UE is the RX UE, signaling-1 (RX to TX) may be carried via a PC5-RRC message from RX UE to TX UE. Signaling-2 (TX to RX) may be carried via signals, such as RRCReconfigurationSidelink, to deliver the SL DRX configuration from TX UE to RX UE. For SL unicast, TX UE centric DRX configuration may be based on the assistance information from the RX UE. TX UE centric DRX configuration means that the TX UE configures the RX UE's SL DRX (i.e., TX UE tells RX UE when to be awake and monitor for sidelink control information (SCI) from the TX UE (active mode), and when to sleep (inactive mode). An inactive state may mean that the RX UE is reducing or shutting down RF components to conserve power . . . .

In certain aspects, for SL DRX configuration of each direction where one UE is the TX UE and the other UE is the RX UE, when TX UE is in-coverage and/or in RRC_CONNECTED state, the TX UE may report the information received in signaling-1 (RX UE to TX UE) to its serving base station. In some aspects, when the TX UE is in-coverage and/or in RRC_CONNECTED state, the TX UE may obtain information related to SL DRX configuration of the RX UE from one or more dedicated RRC messages from it serving base station to generate signaling-2 (TX UE to RX UE). In another aspect, when the RX UE is in-coverage and/or in RRC_CONNECTED state, the RX UE may report the SL DRX configuration received in signaling-2 (TX to RX) to its serving base station.

In some aspects, during the operation, the TX UE may configure the SL DRX of the RX UE in sidelink communication based on information transmitted by the RX UE in signaling-1. For example, if the RX UE has two SL connections, then the active times for monitoring for controls from the two SL TX UEs may not overlap without potential loss of control information if the Rx UE can use only one Rx beam at a time. Therefore, signaling-1 may include information about one or more of the SL UE beam forming capability, the number of TX connections, the number of RX connections, and/or the corresponding (SL/Uu) DRX configurations.

In one aspect of the present disclosure, the RX UE may transmit a first message (e.g., signaling-1) to the TX UE indicating DRX configuration for each of the SL connections with other UEs and/or each of the network connections with BSs. The first message may include a cycle duration and start offset, a slot offset, an on duration length, an inactivity timer duration, and/or a maximum duration of active timer. The first message may include the RF capability of the RX UE, such as a number of simultaneous RF chains, a number of beams configured for DRX, angular separations of the beams configured for DRX, or power leakage values. The TX UE, in response to receiving the first message, may transmit a second message to the RX UE indicating the SL DRX configuration for the SL connection between the TX UE and the RX UE. The RX UE uses the SL DRX configuration to determine wake up and sleep cycles for monitoring for control signals from the TX UE.

FIG. 1 is a diagram illustrating an example of a wireless communications system and an access network 100. The wireless communications system (also referred to as a wireless wide area network (WWAN)) includes at least one BS 105, UEs 110, an Evolved Packet Core (EPC) 160, and a 5G Core (5GC) 190. The BS 105 may include macro cells (high power cellular base station) and/or small cells (low power cellular base station). The macro cells include base stations. The small cells include femtocells, picocells, and microcells. In one implementation, the UE 110 may include a communication component 222 configured to communicate with the BS 105 via a cellular network, a Wi-Fi network, or other wireless and wired networks. In some implementations, the communication component 222 may be implemented using hardware, software, or a combination of hardware and software. In some implementations, the BS 105 may include a communication component 322 configured to communicate with the UE 110. In some implementations, the communication component 322 may be implemented using hardware, software, or a combination of hardware and software.

A BS 105 configured for 4G Long-Term Evolution (LTE) (collectively referred to as Evolved Universal Mobile Telecommunications System (UMTS) Terrestrial Radio Access Network (E-UTRAN)) may interface with the EPC 160 through backhaul links interfaces 132 (e.g., S1, X2, Internet Protocol (IP), or flex interfaces). A BS 105 configured for 5G NR (collectively referred to as Next Generation RAN (NG-RAN)) may interface with 5GC 190 through backhaul links interfaces 134 (e.g., S1, X2, Internet Protocol (IP), or flex interface). In addition to other functions, the BS 105 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The BS 105 may communicate directly or indirectly (e.g., through the EPC 160 or 5GC 190) with each other over the backhaul links interfaces 134. The backhaul links 132, 134 may be wired or wireless.

The BS 105 may wirelessly communicate with the UEs 110. Each of the BS 105 may provide communication coverage for a respective geographic coverage area 130. There may be overlapping geographic coverage areas 130. For example, the small cell 105' may have a coverage area 130' that overlaps the coverage area 130 of one or more macro BS 105. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the BS 105 and the UEs 110 may include uplink (UL) (also referred to as reverse link) transmissions from a UE 110 to a BS 105 and/or downlink (DL) (also referred to as forward link) transmissions from a BS 105 to a UE 110. The communication links 120 may use multiple-input and multiple-output (MIMO) antenna technology, including spatial multiplexing, beamforming, and/or transmit diversity. The communication links may be through one or more carriers. The BS 105/UEs 110 may use spectrum up to Y MHz (e.g., 5, 10, 15, 20, 100, 400, etc. MHz) bandwidth per carrier allocated in a carrier aggregation of up to a total of $Y_x$ MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 110 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 105' may operate in a licensed and/or an unlicensed frequency spectrum. When operating in an unlicensed frequency spectrum, the small cell 105' may employ NR and use the same 5 GHz unlicensed frequency spectrum as used by the Wi-Fi AP 150. The small cell 105', employing NR in an unlicensed frequency spectrum, may boost coverage to and/or increase capacity of the access network.

A BS 105, whether a small cell 105' or a large cell (e.g., macro base station), may include an eNB, gNodeB (gNB), or other type of base station. Some base stations, such as gNB 180 may operate in one or more frequency bands within the electromagnetic spectrum. The electromagnetic spectrum is often subdivided, based on frequency/wavelength, into various classes, bands, channels, etc. In 5G NR two initial operating bands have been identified as frequency range designations FR1 (410 MHz-7.125 GHZ) and FR2 (24.25 GHz-52.6 GHZ). The frequencies between FR1 and FR2 are often referred to as mid-band frequencies. Although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW/near mmW radio frequency band has extremely high path loss and a short range. The mmW base station 180 may utilize beamforming 182 with the UE 110 to compensate for the path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 110 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a packet switched (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the BS 105 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 110 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The BS 105 may also be referred to as a gNB, Node B, evolved Node B (eNB), an access point, a base transceiver station, a radio base station, an access point, an access node, a radio transceiver, a NodeB, eNodeB (eNB), gNB, Home NodeB, a Home eNodeB, a relay, a transceiver function, a basic service set (BSS), an extended service set (ESS), a transmit reception point (TRP), or some other suitable terminology. The BS 105 provides an access point to the EPC 160 or 5GC 190 for a UE 110. Examples of UEs 110 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 110 may be referred to as IoT devices (e.g., parking meter, gas pump, toaster, vehicles, heart monitor, etc.). The UE 110 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
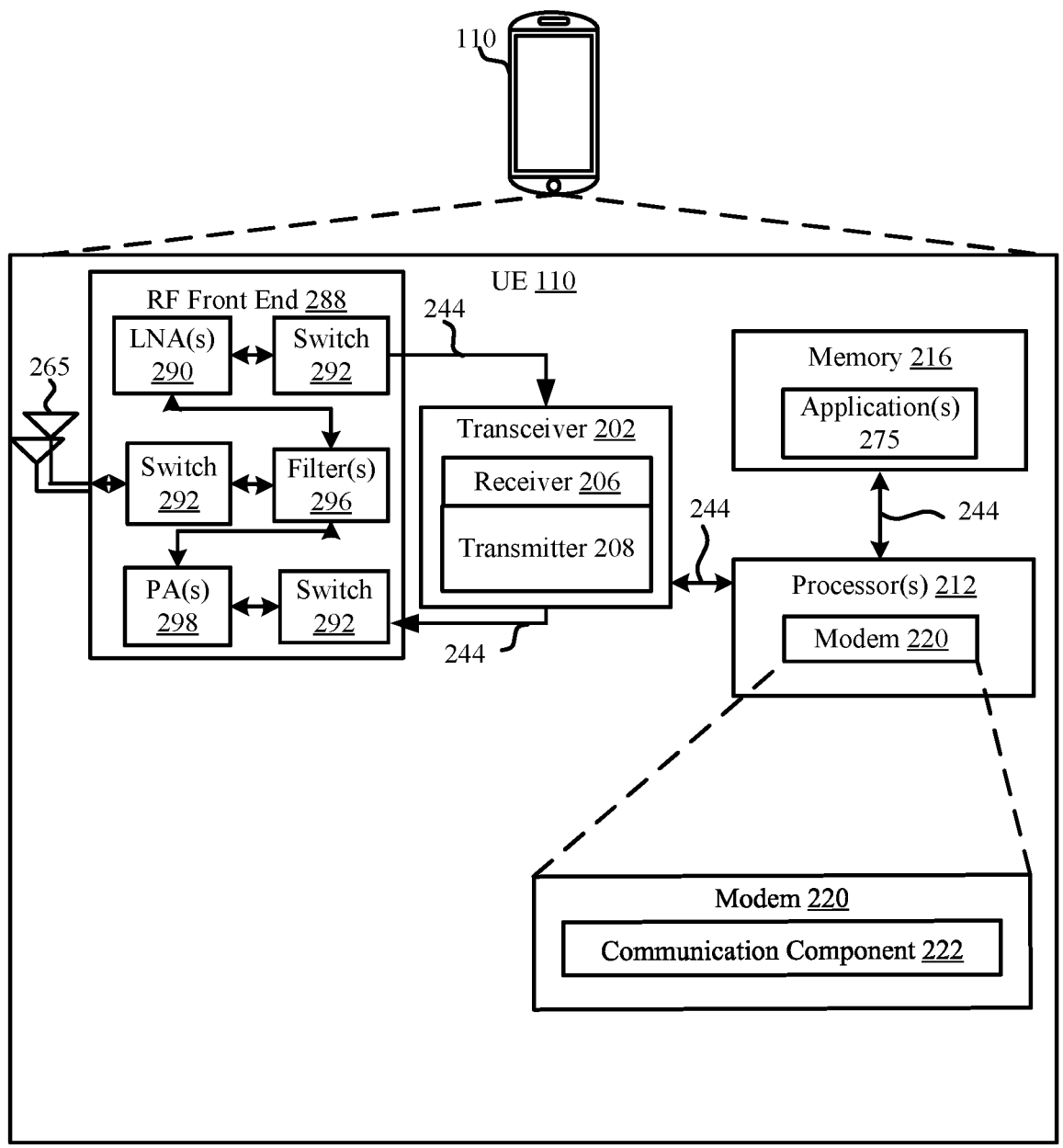
FIG. 2 is a schematic diagram of an example of a user equipment according to aspects of the present disclosure.

Referring to FIG. 2, one example of an implementation of the UE 110 may include a modem 220 having the communication component 222. In one implementation, the UE 110 may include a communication component 222 configured to communicate with the BS 105 via a cellular network, a Wi-Fi network, or other wireless and wired networks.

In some implementations, the UE 110 may include a variety of components, including components such as one or more processors 212 and memory 216 and transceiver 202 in communication via one or more buses 244, which may operate in conjunction with the modem 220 and the communication component 222 to enable one or more of the functions described herein related to communicating with the BS 105. Further, the one or more processors 212, modem 220, memory 216, transceiver 202, RF front end 288 and one or more antennas 265, may be configured to support voice and/or data calls (simultaneously or non-simultaneously) in one or more radio access technologies. The one or more antennas 265 may include one or more antennas, antenna elements and/or antenna arrays.

In an aspect, the one or more processors 212 may include the modem 220 that uses one or more modem processors. The various functions related to the communication component 222 may be included in the modem 220 and/or processors 212 and, in an aspect, may be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiving device processor, or a transceiver processor associated with transceiver 202. Additionally, the modem 220 may configure the UE 110 along with the processors 212. In other aspects, some of the features of the one or more processors 212 and/or the modem 220 associated with the communication component 222 may be performed by transceiver 202.

The memory 216 may be configured to store data used and/or local versions of application 275. Also, the memory 216 may be configured to store data used herein and/or local versions of the communication component 222, and/or one or more of the subcomponents being executed by at least one processor 212. Memory 216 may include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining the communication component 222, and/or one or more of the subcomponents, and/or data associated therewith, when UE 110 is operating at least one processor 212 to execute the communication component 222, and/or one or more of the subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a RF receiving device. In an aspect, the receiver 206 may receive signals transmitted by at least one BS 105. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 110 may include RF front end 288, which may operate in communication with one or more antennas 265 and transceiver 202 for receiving and transmitting radio transmissions, for example, wireless communications transmitted by at least one BS 105 or wireless transmissions transmitted by UE 110. RF front end 288 may be coupled with one or more antennas 265 and may include one or more low-noise amplifiers (LNAs) 290, one or more switches 292, one or more power amplifiers (PAs) 298, and one or more filters 296 for transmitting and receiving RF signals.

In an aspect, LNA 290 may amplify a received signal at a desired output level. In an aspect, each LNA 290 may have a specified minimum and maximum gain values. In an aspect, RF front end 288 may use one or more switches 292 to select a particular LNA 290 and the specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and the specified gain value based on a desired gain value for a particular application.

Also, for example, one or more filters 296 may be used by RF front end 288 to filter a received signal to obtain an input RF signal. Similarly, in an aspect, for example, a respective filter 296 may be used to filter an output from a respective PA 298 to produce an output signal for transmission. In an aspect, each filter 296 may be coupled with a specific LNA 290 and/or PA 298. In an aspect, RF front end 288 may use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 110 may communicate with, for example, one or more BS 105 or one or more cells associated with one or more BS 105. In an aspect, for example, the modem 220 may configure transceiver 202 to operate at a specified frequency and power level based on the UE configuration of the UE 110 and the communication protocol used by the modem 220.

In an aspect, the modem 220 may be a multiband-multimode modem, which may process digital data and communicate with transceiver 202 such that the digital data is sent and received using transceiver 202. In an aspect, the modem 220 may be multiband and be configured to support multiple frequency bands for a specific communications protocol. In an aspect, the modem 220 may be multimode and be configured to support multiple operating networks and communications protocols. In an aspect, the modem 220 may control one or more components of UE 110 (e.g., RF front end 288, transceiver 202) to enable transmission and/or reception of signals from the network based on a specified modem configuration. In an aspect, the modem configuration may be based on the mode of the modem and the frequency band in use. In another aspect, the modem configuration may be based on UE configuration information associated with UE 110 as provided by the network.

Figure 3:
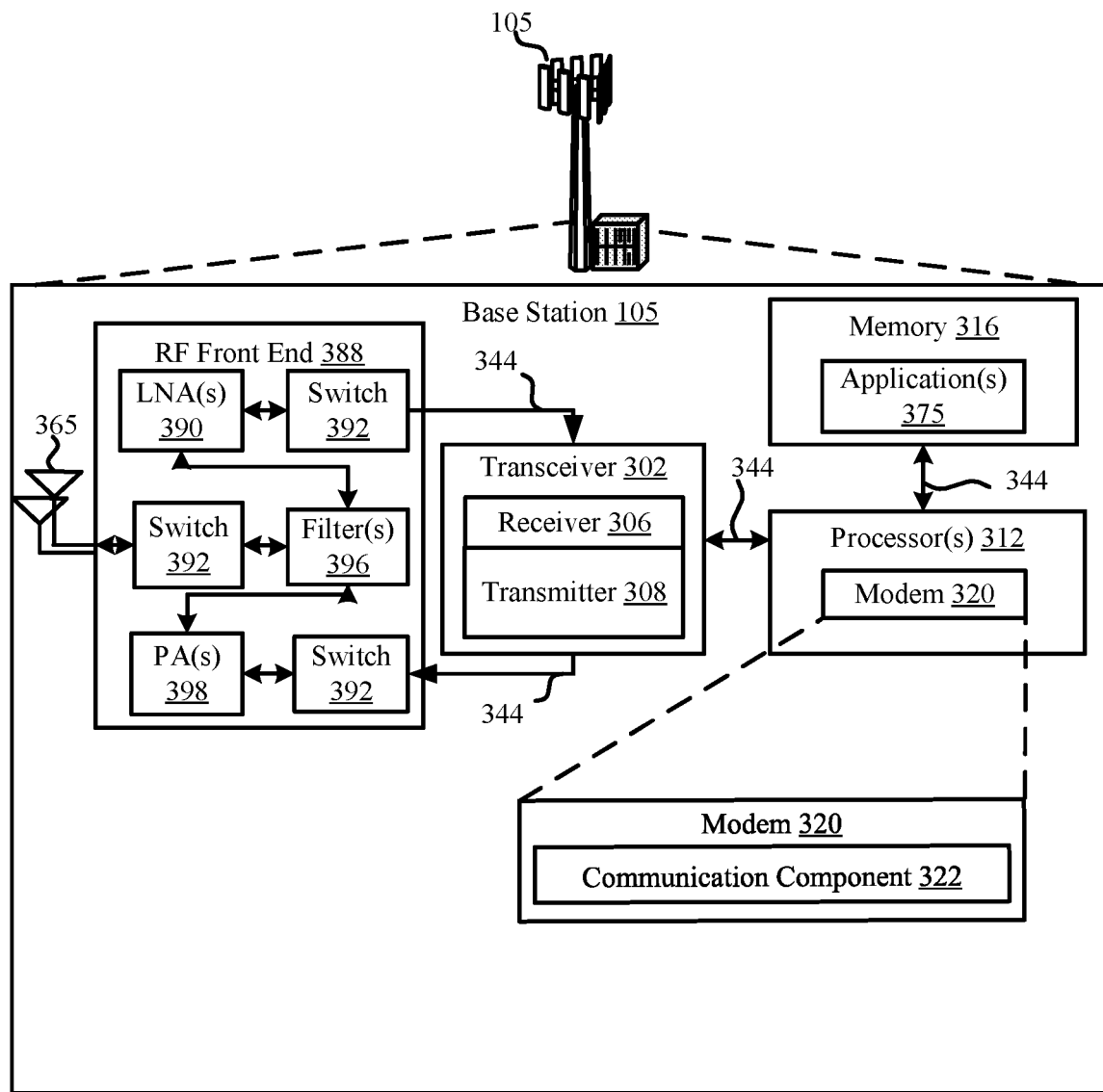
FIG. 3 is a schematic diagram of an example of a base station according to aspects of the present disclosure.

Referring to FIG. 3, one example of an implementation of the BS 105 may include a modem 320 having the communication component 322. In some implementations, the BS 105 may include a communication component 322 configured to communicate with the UE 110.

In some implementations, the BS 105 may include a variety of components, including components such as one or more processors 312 and memory 316 and transceiver 302 in communication via one or more buses 344, which may operate in conjunction with the modem 320 and the communication component 322 to enable one or more of the functions described herein related to communicating with the UE 110. Further, the one or more processors 312, modem 320, memory 316, transceiver 302, RF front end 388 and one or more antennas 365, may be configured to support voice and/or data calls (simultaneously or non-simultaneously) in one or more radio access technologies.

In an aspect, the one or more processors 312 may include the modem 320 that uses one or more modem processors. The various functions related to the communication component 322 may be included in the modem 320 and/or processors 312 and, in an aspect, may be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiving device processor, or a transceiver processor associated with transceiver 302. Additionally, the modem 320 may configure the BS 105 and processors 312. In other aspects, some of the features of the one or more processors 312 and/or the modem 320 associated with the communication component 322 may be performed by transceiver 302.

The memory 316 may be configured to store data used herein and/or local versions of applications 375. Also, the memory 316 may be configured to store data used herein and/or local versions of the communication component 322, and/or one or more of the subcomponents being executed by at least one processor 312. Memory 316 may include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory 316 may be a non-transitory computer-readable storage medium that stores one or more computer-executable codes defining the communication component 322, and/or one or more of the subcomponents, and/or data associated therewith, when the BS 105 is operating at least one processor 312 to execute the communication component 322, and/or one or more of the subcomponents.

Transceiver 302 may include at least one receiver 306 and at least one transmitter 308. The at least one receiver 306 may include hardware, firmware, and/or software code executable by a processor for receiving data, the code comprising instructions and being stored in a memory (e.g., computer-readable medium). The receiver 306 may be, for example, a RF receiving device. In an aspect, receiver 306 may receive signals transmitted by the UE 110. Transmitter 308 may include hardware, firmware, and/or software code executable by a processor for transmitting data, the code comprising instructions and being stored in a memory (e.g., computer-readable medium). A suitable example of transmitter 308 may including, but is not limited to, an RF transmitter.

Moreover, in an aspect, the BS 105 may include RF front end 388, which may operate in communication with one or more antennas 365 and transceiver 302 for receiving and transmitting radio transmissions, for example, wireless communications transmitted by other BS 105 or wireless transmissions transmitted by UE 110. RF front end 388 may be coupled with one or more antennas 365 and may include one or more low-noise amplifiers (LNAs) 390, one or more switches 392, one or more power amplifiers (PAS) 398, and one or more filters 396 for transmitting and receiving RF signals.

In an aspect, LNA 390 may amplify a received signal at a desired output level. In an aspect, each LNA 390 may have a specified minimum and maximum gain values. In an aspect, RF front end 388 may use one or more switches 392 to select a particular LNA 390 and the specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and the specified gain value based on a desired gain value for a particular application.

Also, for example, one or more filters 396 may be used by RF front end 388 to filter a received signal to obtain an input RF signal. Similarly, in an aspect, for example, a respective filter 396 may be used to filter an output from a respective PA 398 to produce an output signal for transmission. In an aspect, each filter 396 may be coupled with a specific LNA 390 and/or PA 398. In an aspect, RF front end 388 may use one or more switches 392 to select a transmit or receive path using a specified filter 396, LNA 390, and/or PA 398, based on a configuration as specified by transceiver 302 and/or processor 312.

As such, transceiver 302 may be configured to transmit and receive wireless signals through one or more antennas 365 via RF front end 388. In an aspect, transceiver may be tuned to operate at specified frequencies such that BS 105 may communicate with, for example, the UE 110 or one or more cells associated with one or more BS 105. In an aspect, for example, the modem 320 may configure transceiver 302 to operate at a specified frequency and power level based on the base station configuration of the BS 105 and the communication protocol used by the modem 320.

In an aspect, the modem 320 may be a multiband-multimode modem, which may process digital data and communicate with transceiver 302 such that the digital data is sent and received using transceiver 302. In an aspect, the modem 320 may be multiband and be configured to support multiple frequency bands for a specific communications protocol. In an aspect, the modem 320 may be multimode and be configured to support multiple operating networks and communications protocols. In an aspect, the modem 320 may control one or more components of the BS 105 (e.g., RF front end 388, transceiver 302) to enable transmission and/or reception of signals from the network based on a specified modem configuration. In an aspect, the modem configuration may be based on the mode of the modem and the frequency band in use. In another aspect, the modem configuration may be based on base station configuration associated with the BS 105.

Figure 4:
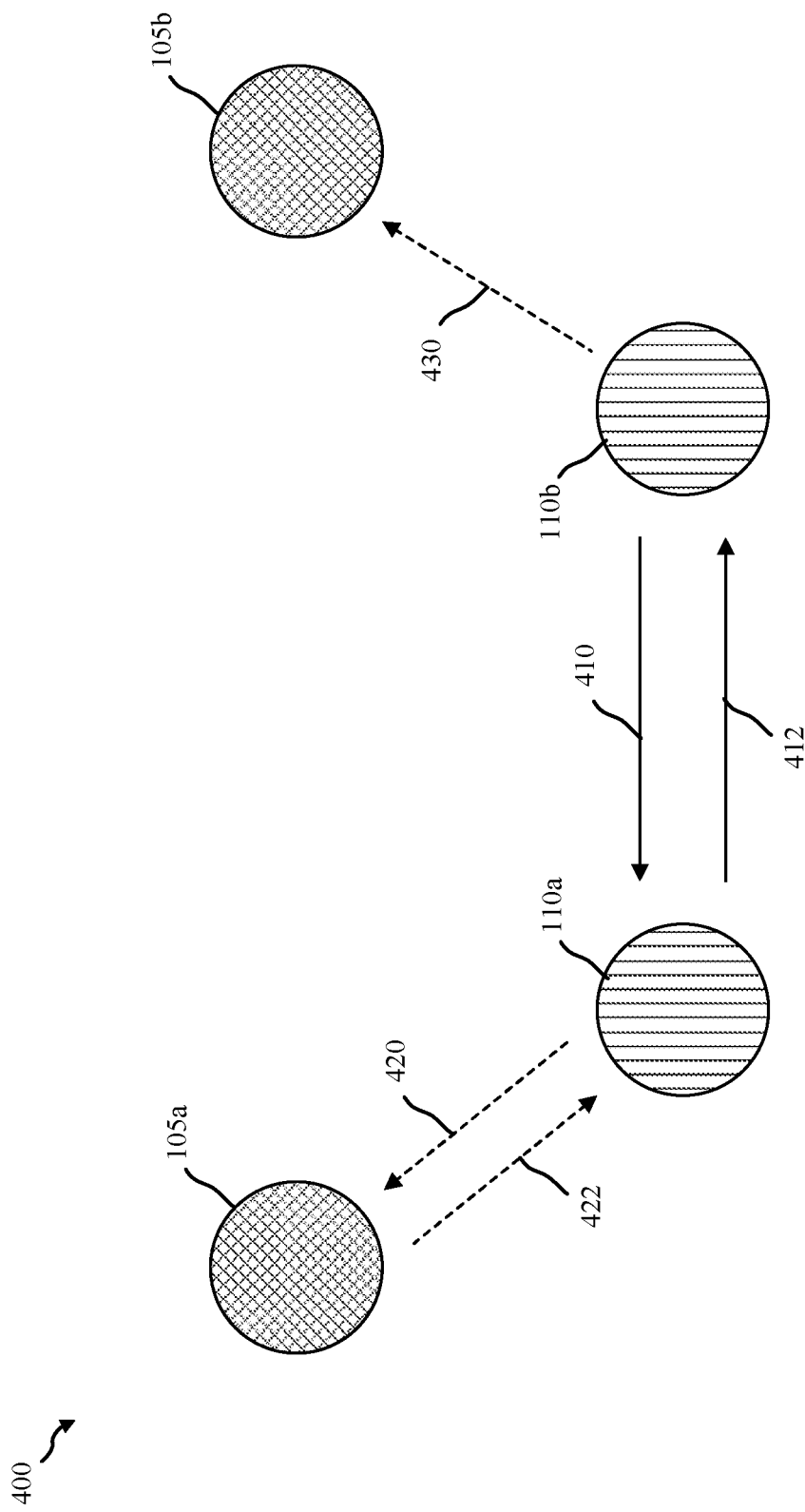
FIG. 4 illustrates an example of an environment for communicating sidelink discontinuous reception (DRX) DRX configurations according to aspects of the present disclosure.

FIG. 4 illustrates an example of an environment for communicating DRX configurations. In one aspect, the environment 100 includes a first BS 105a, a second BS 105b, a TX UE 110a, and a RX UE 110b. In one example, the first BS 105a and the second BS 105b may each be a gNB. For the TX UE centric DRX configuration scheme, the RX UE 110b may transmit a first message 410 (i.e., signaling-1) via a SL connection to the TX UE 110a. The first message 410 may be used by the TX UE 110a to determine the configuration for the SL DRX between the RX UE 110b and the TX UE 110a. The first message 410 may include DRX configurations, preferences, and/or priority information of one or more connections between the RX UE 110b and other devices, such as the second BS 105b. The first message 410 may include DRX parameters such as the cycle duration and start offset (e.g., drx-LongCycleStartOffset), the slot offset (e.g., drx-SlotOffset), the on duration length (e.g., drx-OnDurationTimer), the inactivity timer duration (e.g., drx-InactivityTimer), and/or the maximum duration of active timer for each of the one or more connections. The first message 410 may include preferences of the RX UE 110b. For example, the RX UE 110b may be able to receive from two SL TX UEs using a RX beam. It may be more efficient to have the on durations corresponding to the two SL TX UEs overlap in time partially, substantially, or completely. If the RX UE 110b has an existing SL DRX configured with one of the two SL TX UEs, the RX UE 110b may indicate to the TX UE 110a the preference to align the SL DRX with the other SL DRX of the other SL TX UE. The first message 410 may include an indication of priority among the SL DRX and one or more SL DRX with one or more SL UEs (not shown). The first message 410 may include an indication of priority among the DRX and one or more receptions from the TX UE 110a.

Alternatively or additionally, in some aspects, the first message 410 may include the RF capabilities of the RX UE 110b, including the number of antennas or antenna arrays, the number of RX beams and/or TX beams the RX UE 110b is able to support at a given time (i.e., the number of contemporaneous transmissions and/or receptions), the number of RX beams and/or TX beams already allocated for DRX, angular separations between the beams already allocated and beams to be allocated for DRX with the TX UE 110a, and/or power leakage from the beams already allocated to the beams to be allocated for DRX with the TX UE 110a.

In response to receiving the first message 410, the TX UE 110a may transmit a second message 412 (e.g., signaling-2) to the RX UE 110b. The second message 412 may include a current SL DRX configuration for the SL communication between the TX UE 110a and the RX UE 110b. The current DRX configuration may include one or more of the current cycle duration and start offset value, the current slot offset value, the current on duration length value, the current inactivity timer duration value, or the current maximum duration of active timer value. The RX UE 110b monitors for control signals from the TX UE 110a during wake up cycles and saves power during sleep cycles; wake up and sleep cycles are determined based on the second message 412.

In some instances, during a radio resource control (RRC) connected state, the TX UE 110a may transmit at least some information in the first message 410 to the first BS 105a in a third message 420. Based on the third message 420, the first BS 105a may respond with a fourth message 422. The fourth message 422 may include SL DRX configuration information for the SL DRX between the TX UE 110a and the RX UE 110b. The TX UE 110a may generate the second message 412 based on the information in the fourth message 422. In some instance, the RX UE 110b may report the SL DRX configuration for the SL DRX to the second BS 105b.

Figure 5:
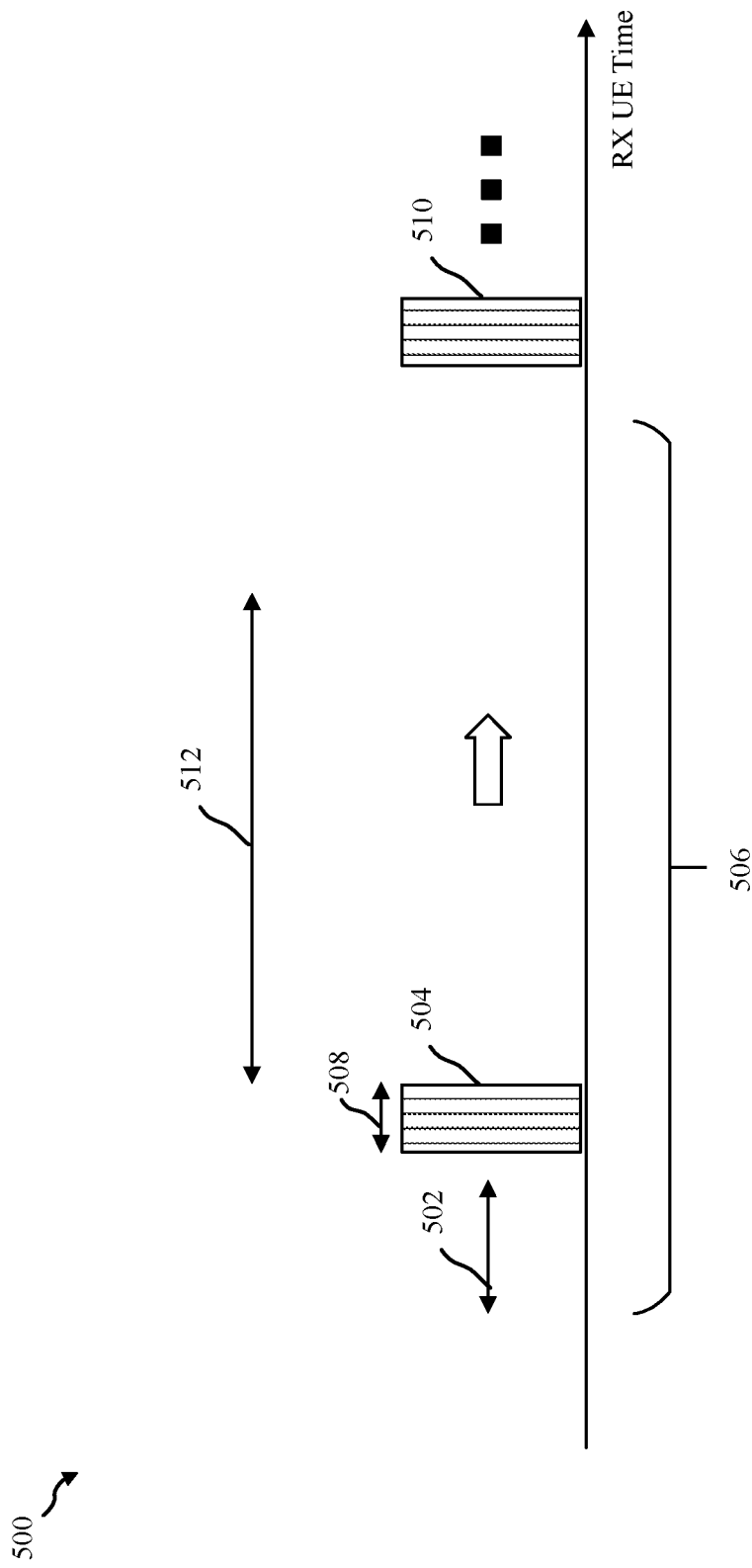
FIG. 5 illustrates an example of a timing diagram of SL DRX according to aspects of the present disclosure.

FIG. 5 illustrates an example of a timing diagram of SL DRX. In some aspects, a diagram 500 shows an example of SL DRX of the RX UE 110b. The diagram 500 shows a first duration 504 that is a slot offset 502 from a beginning of a cycle duration 506. The RX UE 110b may actively monitor for control signals (e.g., sidelink control information) from the TX UE 110a during the first duration 504. The amount of time of the first duration 504 may be indicated by an on duration length 508. The cycle duration 506 may indicate a period of the RX UE 110b that activates RF components to monitor the control signals (the active state) and another period of the RX UE 110b that deactivates the RF components (the sleep state). Specifically, the RX UE 110b may monitor the control signals during the first duration 504 within the cycle duration 506. After the end of the cycle duration 506, the RX UE 110b may monitor the control signals during a second duration 510 subsequent to the cycle duration 506. Additionally or alternatively, the RX UE 110b may implement a maximum duration of active timer 512 that indicates the maximum value to extend the first duration 504. In some cases, the maximum duration of active timer 512 may be less than the cycle duration 506.

Figure 6:
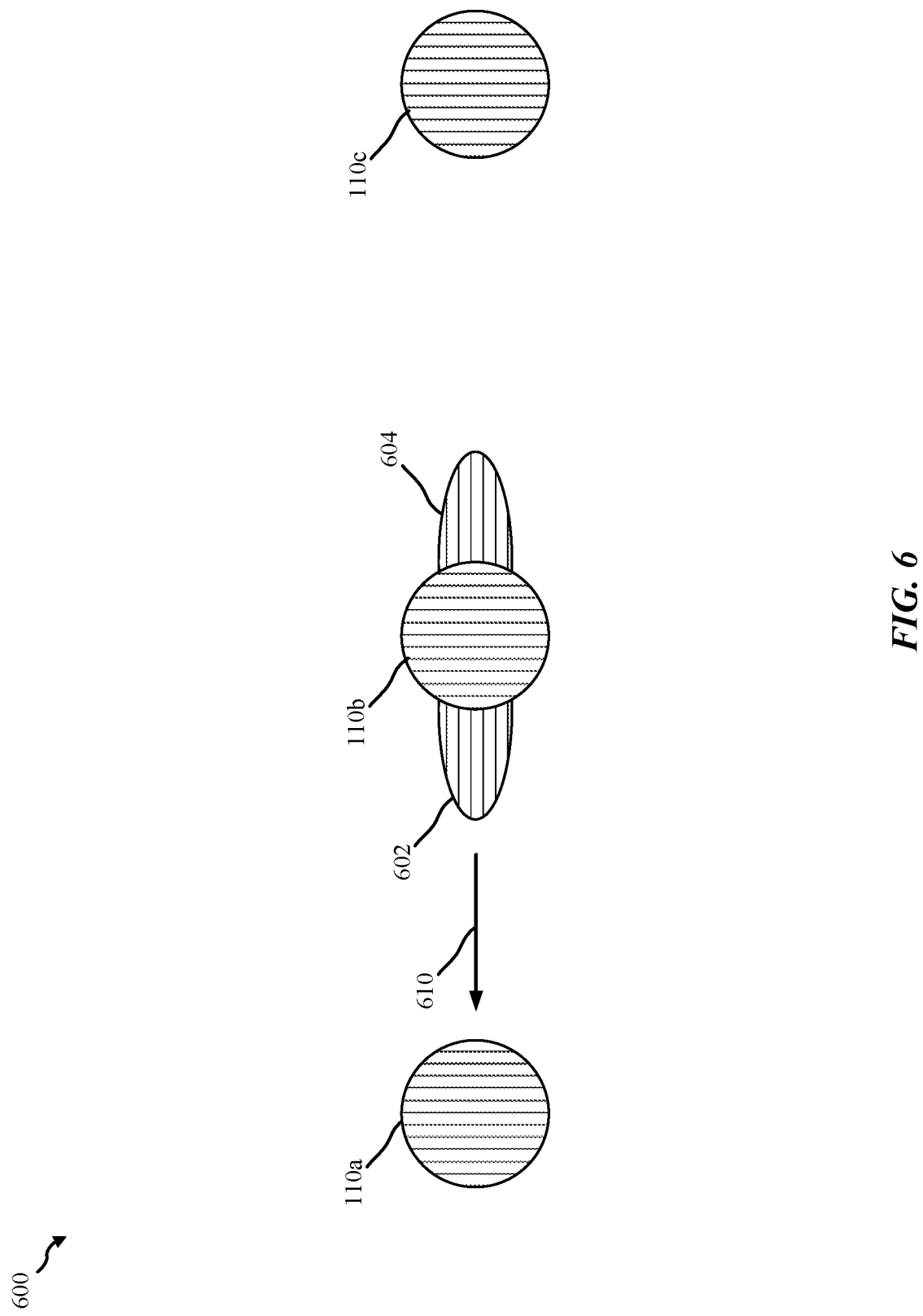
FIG. 6 illustrates an example of an environment having a reception (RX) UE having multiple SL connections according to aspects of the present disclosure.

FIG. 6 illustrates an example of an environment having a RX UE 110b having multiple SL connections. In certain aspects, the RX UE 110b may communicate via SL connections with the TX UE 110a (referred to as the first TX UE 110a) and the second TX UE 110c. The RX UE 110b may allocate RF resources to transmit/receive information to/from only one UE at a time (the first TX UE 110a or the second TX UE 110b) to conserve electrical power. In other aspects, the RX UE 110b may have sufficient RF resources to transmit/receive information to/from only one UE to reduce hardware complexity. For example, the RX UE 110b may form a first beam 602 when communicating with the first TX UE 110a and a second beam 604 when communicating with the second TX UE 110c. As such, the RX UE 110b may allocate the RF resources to the first beam 602 when monitoring SL control signals from the first TX UE 110a during a first SL DRX. The RX UE 110b may allocate the RF resources to the second beam 604 when monitoring SL control signals from the second TX UE 110c during a second SL DRX. The active time 504 of the first SL DRX and the active time 504 of the second DRX may not overlap. In other words, when the RX UE 110b is monitoring for SL control signals from the first TX UE 110a, the RX UE 110b may be unable to monitor for SL control signals from the second TX UE 110c, and vice versa.

In some aspects of the present disclosure, when the RX UE 110b transmits a first message (e.g., signal-1) 610 to the first TX UE 110a, the RX UE 110b may indicate the second SL DRX associated with the SL connection with the second TX UE 110c. For example, the configuration message 610 may include information relating to SL UE beam forming capability of the RX UE 110b, the number of TX connections, the number of RX connections, and/or corresponding SL or network DRX configurations.

Figure 7:
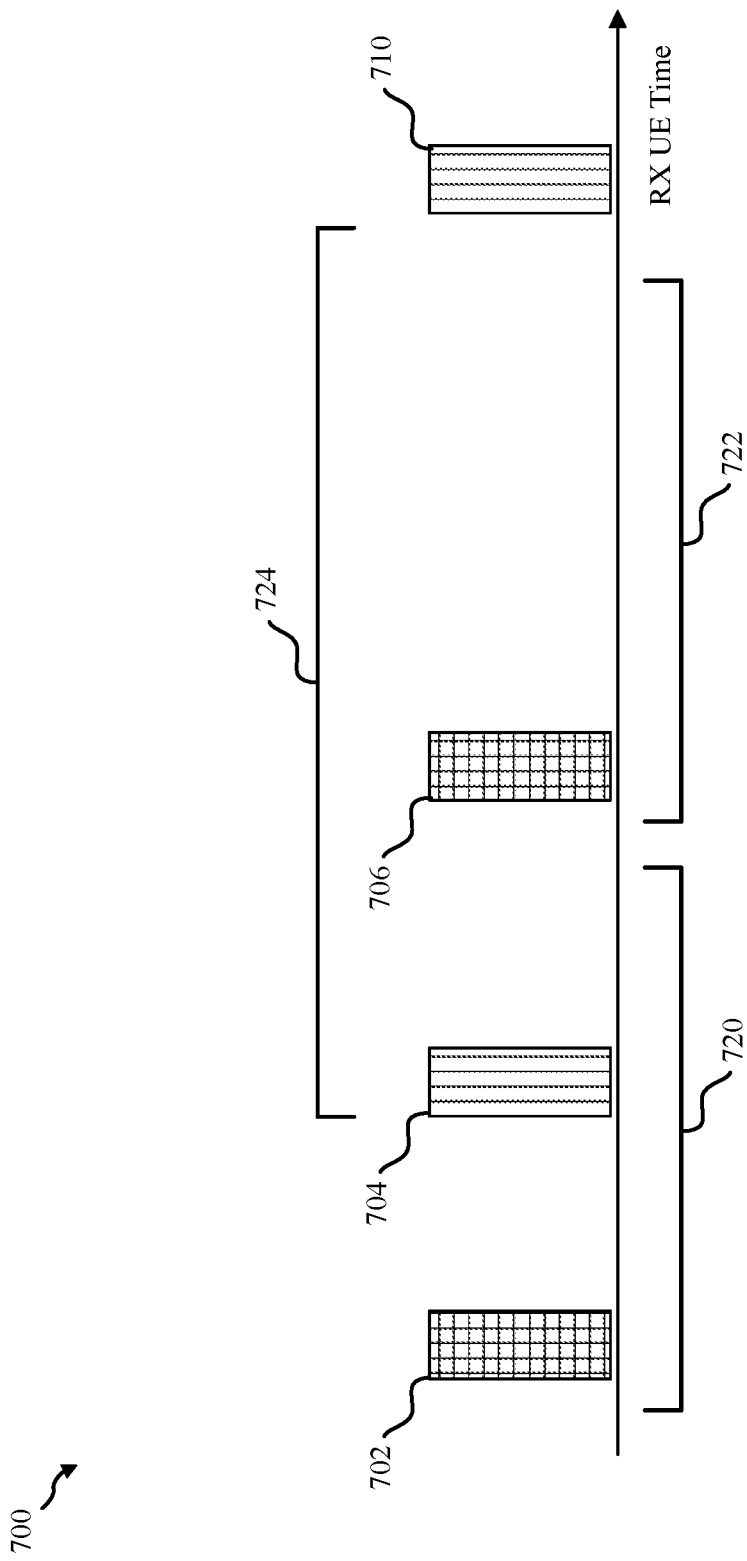
FIG. 7 illustrates an example of a diagram showing SL DRX of a RX UE having more than one connection according to aspects of the present disclosure.

FIG. 7 illustrates an example of a diagram showing SL DRX configurations of a RX UE having more than one connection. In an aspect of the present disclosure and referencing FIG. 6, a diagram 700 may illustrate the RX UE 110b receiving SL control messages relating to SL DRX from the first TX UE 110a and the second TX UE 110c. The RX UE 110b and the second TX UE 110c may have an existing SL DRX when the RX UE 110b and the first TX UE 110a are attempting to configure a SL DRX of the RX UE 110*b*. The RX UE 110*b* may monitor a first reception duration 702 or a second reception duration 706 for SL control information from the second TX UE 110*c* within a first SL DRX reception cycle 720 or within a second SL DRX reception cycle 722. During the first and the second reception durations 702 and 706, the RX UE 110*b* may configure the RF component of the RX UE 110*b* to the second beam 604 to monitor for any SL control information transmitted by the second TX UE 110*c*.

In some aspects, the SL DRX at the RX UE 110*b* for the SL connection between the first TX UE 110*a* and the RX UE 110*b* may be configured (by the first TX UE 110*a*) within a third SL DRX reception cycle 724. The SL DRX at the RX UE 110*b* for receiving control signal from the TX UE 11*a* may be configured with a third reception duration 704 between the second reception duration 706 (allocated for the second TX UE 110*c*) and a first reception duration 702 (allocated for the second TX UE 110*c*). The RX UE 110*b* may configure the RF components of the RX UE 110*b* to the first beam 602 during the third reception duration 704 to monitor for any SL control information transmitted by the first TX UE 110*a*.

Figure 8:
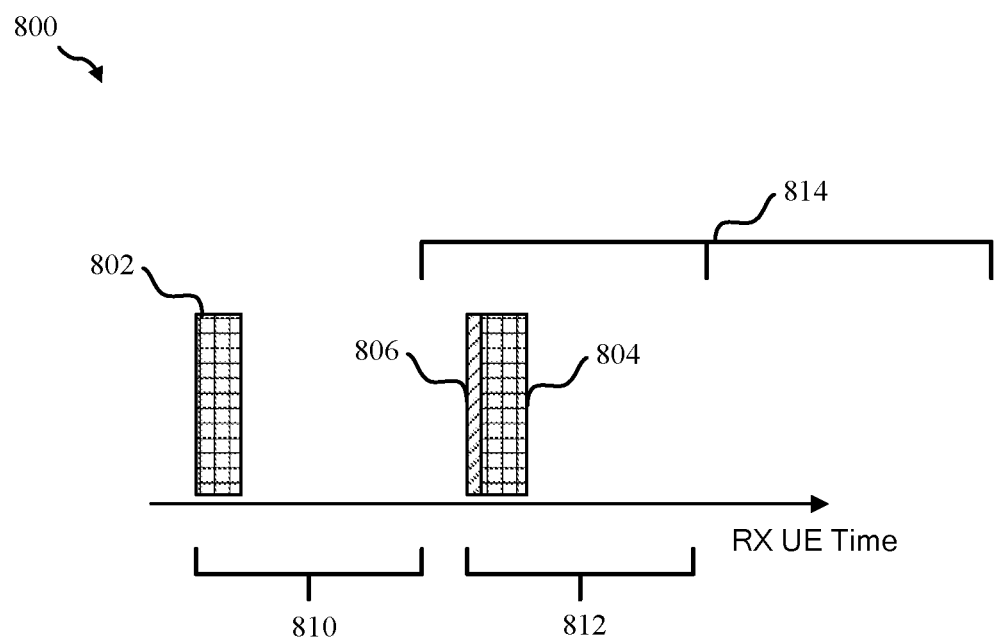
FIG. 8 illustrates examples of diagrams showing SL DRX collisions and/or priorities according to aspects of the present disclosure.
Figure 8:
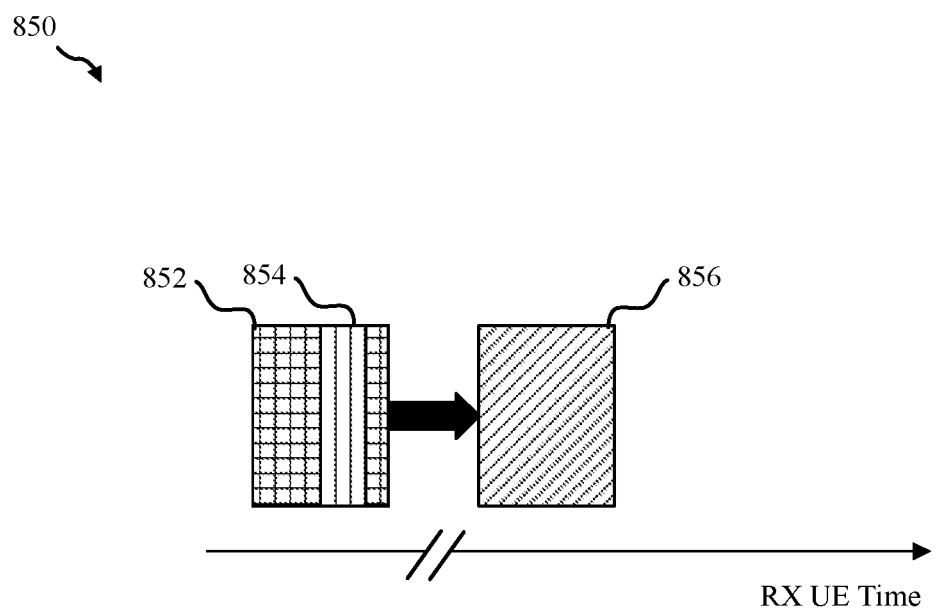

FIG. 8 illustrates examples of diagrams showing DRX collisions and/or priorities. In an aspect and referencing FIG. 6, a first diagram 800 shows an example of potential collision of DRXs at the RX UE 110*b*. Possibility of collision may depend on the cycle duration and start offset, the slot offset, and/or the on duration length. In one aspect, the first diagram 800 shows a first reception duration 802 (for receiving SL control information from the second TX UE 110*c*) within a first reception cycle 810 and a second reception duration 804 (for receiving SL control information from the second TX UE 110*c*) within a second reception cycle 812. Upon establishing SL communication with the first TX UE 110*a*, the RX UE 110*b* may transmit the DRX configuration in signal-1, including the DRX for the second TX UE 110*c*, to the first TX UE 110*a*. The first TX UE 110*a* may schedule the DRX for the first TX UE 110*a* during a third reception duration 806 within a third reception cycle 814. The DRX for the first TX UE 110*a* may be scheduled adjacent (temporally) to, or close by the DRX for the second TX UE 110*c*. Specifically, the third reception duration 806 may be adjacent in time to the second reception duration 804. The configuration shown may reduce power consumption of the RX UE 110*b* by reducing the switching of the RF components between active states and inactive states. In other words, the RX UE 110*b* maintains the RF components in the active states when transitioning from the first beam 602 to the second beam 604, thereby reducing power consumption due to RF components switching. While the example shown in the diagram 800 illustrates the third reception duration 806 being adjacent in time to the second reception duration 804, other implementations may be configured. For example, the third reception duration 806 may be scheduled "sufficiently close" to the second reception duration 804 such that no RF components deactivation occurs when switching from the first beam 602 to the second beam 604.

In certain instances, scheduling the third reception duration 806 adjacent (or sufficiently close) to the second reception duration 804 may cause a collision when the SL control information transmitted by the first TX UE 110*a* requires more time to transmit than the third reception duration 806 (i.e., the third reception duration 806 is extended). The extra time required may overlap with the second reception duration 804, causing a collision. When a collision occurs, the RX UE 110*b* may rely on a priority between the DRXs for the first TX UE 110*a* and the second TX UE 110*c* to determine which SL control information to receive (i.e., which beam to use). If the DRX for the first TX UE 110*a* has priority over the DRX of the second TX UE 110*c*, the RX UE 110*b* may maintain the first beam 602 during at least a portion of the second reception duration 804 in order to receive the SL control information from the first TX UE 110*a*. In such case, the RX UE 110*b* may transmit an updated configuration to the second TX UE 110*c* indicating the collision. Alternatively, if the DRX for the second TX UE 110*c* has priority over the DRX of the first TX UE 110*a*, the RX UE 110*b* may switch to the second beam 602 at the beginning of the second reception duration 804 even if the RX UE 110*b* has not received all the SL control information from the first TX UE 110*a* in the third reception duration 806. In such case, the RX UE 110*b* may transmit an updated configuration to the first TX UE 110*a* indicating the collision.

In other aspects, a diagram 850 shows another example of collision. The RX UE 110*b* may be configured to monitor a fourth reception duration 852 for SL control information from the second TX UE 110*c* and a fifth reception duration 854 for SL control information from the first TX UE 110*a*. The fourth reception duration 852 and the fifth reception duration 854 overlap in time. If the DRX for the second TX UE 110*c* has priority over the DRX for the first TX UE 110*a*, the RX UE 110*b* may maintain the second beam 604 for the entire duration of the sixth reception duration 856.

Figure 9:
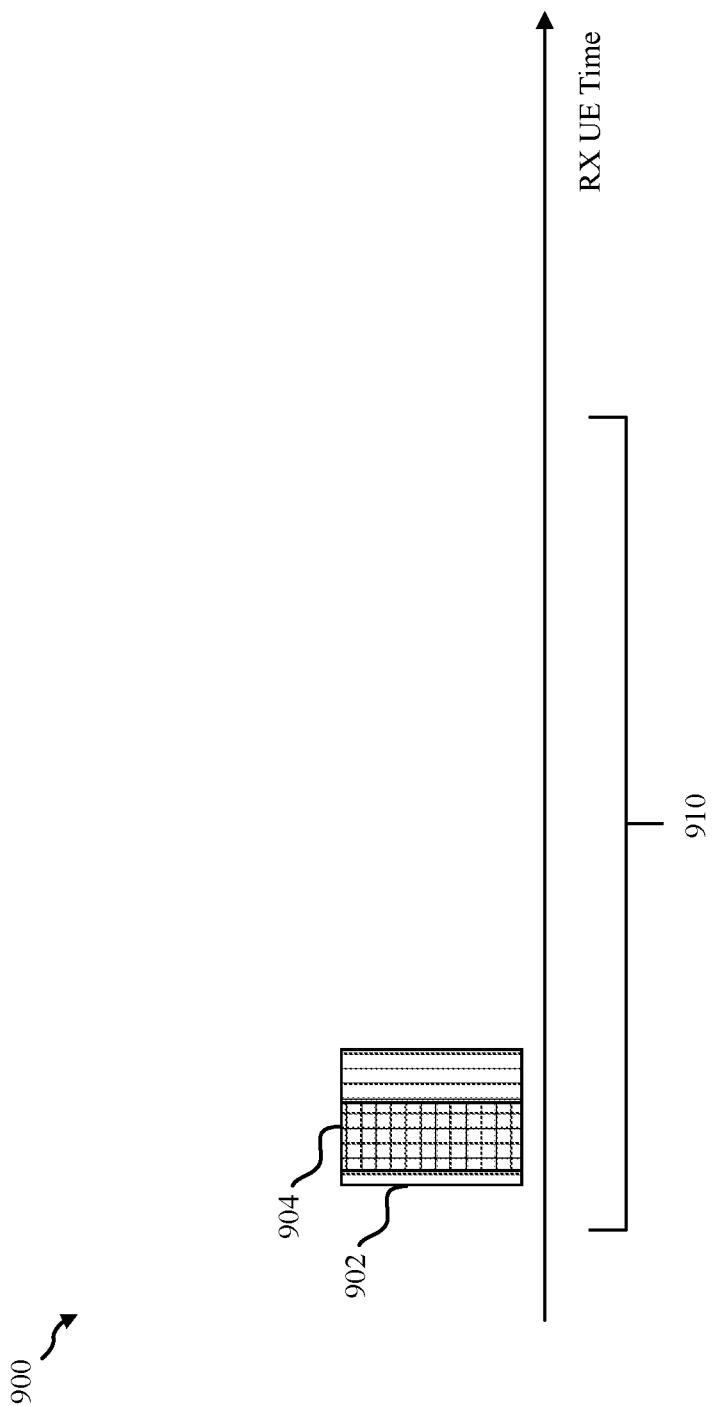
FIG. 9 illustrates an example of a diagram showing SL DRX preferences according to aspects of the present disclosure.

FIG. 9 illustrates an example of a diagram showing DRX preferences. In certain aspects and referencing FIG. 6, a diagram 900 shows an example of preference of DRX by the RX UE 110*b*. The diagram 900 shows a first reception duration 902 (for receiving SL control information from the second TX UE 110*c*) within a first reception cycle 910. The RX UE 110*b* may indicate a preference (in the DRX configuration in signaling-1) to align the SL DRX for the SL communication with the first TX UE 110*a* with the DRX for the SL communication with the second TX UE 110*b*. The preference for aligning the two SL DRXs may be based on the RX beams used for receiving from TX UE 110*c* and from TX UE 110*a* may have similar spatial properties (i.e., the RX beams have similar beam direction or beam width). For example, the RX UE 110*b* may indicate a preference of the same cycle duration and start offset for the SL DRX of the first TX UE 110*a* and the SL DRX of the second TX UE 110*c*. As a result, the first TX UE 110*a* may configure the RX UE 110*b* to monitor for SL control information during a second reception duration 904 (for receiving SL control information from the first TX UE 110*a*) within the first reception cycle 910. The first reception duration 902 and the second reception duration 904 may be adjacent to each other or may overlap substantially. As a result, the RX UE 110*b* may utilize the same beam for receiving SL control information from the first TX UE 110*a* and the second TX UE 110*c*.

Figure 10:
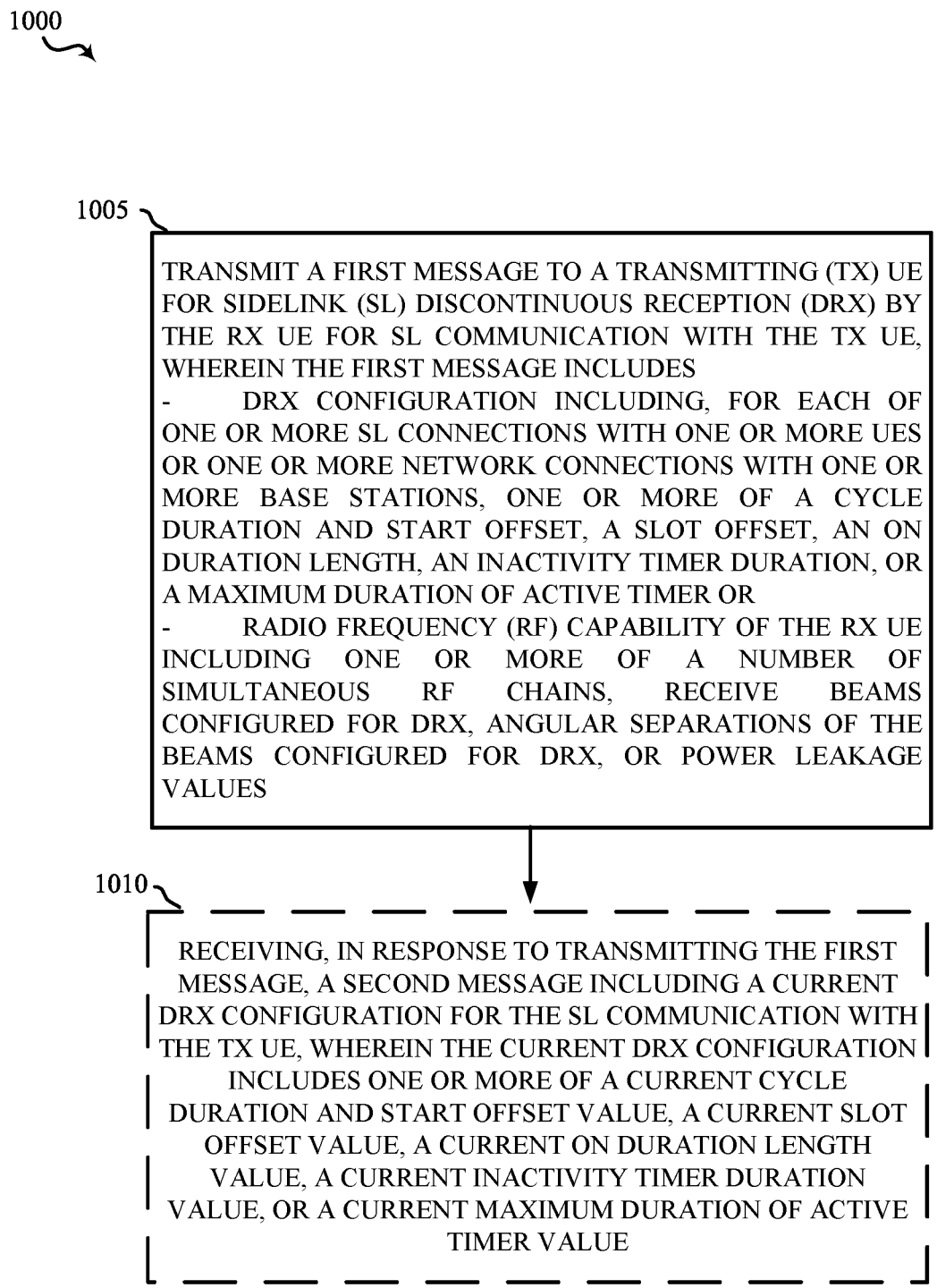
FIG. 10 illustrates an example of a method for transmitting SL DRX configuration and/or RF capability according to aspects of the present disclosure.

FIG. 10 illustrates an example of a method for transmitting DRX configuration and/or RF capability. For example, a method 1000 may be performed by the one or more of the processor 212, the memory 216, the applications 275, the modem 220, the transceiver 202, the receiver 206, the transmitter 208, the RF front end 288, the communication component 222, and/or one or more other components of the UE 110 in the wireless communication network 100.

At block 1005, the method 1000 may transmit a first message to a transmitting (TX) UE for sidelink (SL) discontinuous reception (DRX) by the RX UE for SL communication with the TX UE, wherein the first message includes one or more of a DRX configuration including, for each of one or more SL connections with one or more SL UEs or one or more network connections with one or more base stations, one or more of a cycle duration and start offset, a slot offset, an on duration length, an inactivity timer duration, or a maximum duration of active timer or a radio frequency (RF) capability of the RX UE including one or more of a number of simultaneous RF chains, a number of beams configured for DRX, angular separations of beams configured for DRX, or power leakage values. For example, the communication component 222, the transceiver 202, the receiver 206, the transmitter 208, the RF front end 288, the subcomponents of the RF front end 288, the processor 212, the memory 216, the modem 220, and/or the applications 275 of the UE 110 may transmit a first message to a transmitting (TX) UE for sidelink (SL) discontinuous reception (DRX) by the RX UE for SL communication with the TX UE, wherein the first message includes one or more of a DRX configuration including, for each of one or more SL connections with one or more SL UEs or one or more network connections with one or more base stations, one or more of a cycle duration and start offset, a slot offset, an on duration length, an inactivity timer duration, or a maximum duration of active timer or a radio frequency (RF) capability of the RX UE including one or more of a number of simultaneous RF chains, a number of beams configured for DRX, angular separations of beams configured for DRX, or power leakage values as described above. The communication component 222 may send the digital signals to the transceiver 202 or the transmitter 208. The transceiver 202 or the transmitter 208 may convert the digital signals to electrical signals and send to the RF front end 288. The RF front end 288 may filter and/or amplify the electrical signals. The RF front end 288 may send the electrical signals as electro-magnetic signals via the one or more antennas 265.

In certain implementations, the communication component 222, the transceiver 202, the receiver 206, the transmitter 208, the RF front end 288, the subcomponents of the RF front end 288, the processor 212, the memory 216, the modem 220, and/or the applications 275 may be configured to and/or may define means for transmitting a first message to a transmitting (TX) UE for sidelink (SL) discontinuous reception (DRX) by the RX UE for SL communication with the TX UE, wherein the first message includes one or more of a DRX configuration including, for each of one or more SL connections with one or more SL UEs or one or more network connections with one or more base stations, one or more of a cycle duration and start offset, a slot offset, an on duration length, an inactivity timer duration, or a maximum duration of active timer or a radio frequency (RF) capability of the RX UE including one or more of a number of simultaneous RF chains, a number of beams configured for DRX, angular separations of beams configured for DRX, or power leakage values.

At block 1010, the method 1000 may optionally receive, in response to transmitting the first message, a second message including a current DRX configuration for the SL communication with the TX UE, wherein the current DRX configuration includes one or more of a current cycle duration and start offset value, a current slot offset value, a current on duration length value, a current inactivity timer duration value, or a current maximum duration of active timer value.

In certain implementations, the communication component 222, the transceiver 202, the receiver 206, the transmitter 208, the RF front end 288, the subcomponents of the RF front end 288, the processor 212, the memory 216, the modem 220, and/or the applications 275 may be configured to and/or may define means for receiving, in response to transmitting the first message, a second message including a current DRX configuration for the SL communication with the TX UE, wherein the current DRX configuration includes one or more of a current cycle duration and start offset value, a current slot offset value, a current on duration length value, a current inactivity timer duration value, or a current maximum duration of active timer value.

Alternatively or additionally, the method 1000 may further include any of the methods above, wherein the first message further includes an indication of priority among the SL DRX and one or more SL DRX with the one or more SL UEs.

Alternatively or additionally, the method 1000 may further include any of the methods above, wherein the first message further includes an indication of priority among the TX UE and the one or more SL UEs.

Alternatively or additionally, the method 1000 may further include any of the methods above, further comprising establishing a new connection with a SL UE or a network after transmitting the first message and transmitting an update message indicating a first update to the SL DRX configuration or a second update to the RF capability in response to establishing the new connection.

Alternatively or additionally, the method 1000 may further include any of the methods above, further comprising establishing a SL connection of the one or more SL connections or a network connection of the one or more network connections, and indicating a preference in the first message for the DRX for the SL communication based on the SL connection or the network connection.

Alternatively or additionally, the method 1000 may further include any of the methods above, wherein the preference includes aligning the DRX of the SL communication with a previously established DRX of the SL connection or the network connection.

Alternatively or additionally, the method 1000 may further include any of the methods above, further comprising receiving, in response to transmitting the first message, a second message including a current DRX configuration for the SL communication with the TX UE, wherein the current DRX configuration includes one or more of a current cycle duration and start offset value, a current slot offset value, a current on duration length value, a current inactivity timer duration value, or a current maximum duration of active timer value.

FIG. 11 illustrates an example of a method for transmitting DRX configuration and/or RF capability. For example, a method 1100 may be performed by the one or more of the processor 312, the memory 316, the applications 375, the modem 320, the transceiver 302, the receiver 306, the transmitter 308, the RF front end 388, the communication component 322, and/or one or more other components of the BS 105 in the wireless communication network 100.

At block 1105, the method 1100 may receive a first message from a receiving (RX) UE for sidelink (SL) discontinuous reception (DRX) by the RX UE for SL communication with the TX UE, wherein the first message includes one or more of a DRX configuration including, for each of one or more SL connections with one or more SL UEs or one or more network connections with one or more bae stations, one or more of a cycle duration and start offset, a slot offset, an on duration length, an inactivity timer duration, or a maximum duration of active timer or a radio frequency (RF) capability of the RX UE including one or more of a number of simultaneous RF chains, a number of beams configured for DRX, angular separations of beams configured for DRX, or power leakage values. For example, the communication component 322, the transceiver 302, the receiver 306, the transmitter 308, the RF front end 388, the subcomponents of the RF front end 388, the processor 312, the memory 316, the modem 320, and/or the applications 375 of the BS 105 may receive a first message from a receiving (RX) UE for sidelink (SL) discontinuous reception (DRX) by the RX UE for SL communication with the TX UE, wherein the first message includes one or more of a DRX configuration including, for each of one or more SL connections with one or more SL UEs or one or more network connections with one or more bae stations, one or more of a cycle duration and start offset, a slot offset, an on duration length, an inactivity timer duration, or a maximum duration of active timer or a radio frequency (RF) capability of the RX UE including one or more of a number of simultaneous RF chains, a number of beams configured for DRX, angular separations of beams configured for DRX, or power leakage values as described above. The RF front end 288 may receive the electrical signals converted from electro-magnetic signals. The RF front end 288 may filter and/or amplify the electrical signals. The transceiver 202 or the receiver 206 may convert the electrical signals to digital signals, and send the digital signals to the communication component 222.

In certain implementations, the communication component 322, the transceiver 302, the receiver 306, the transmitter 308, the RF front end 388, the subcomponents of the RF front end 388, the processor 312, the memory 316, the modem 320, and/or the applications 375 may be configured to and/or may define means for receiving a first message from a receiving (RX) UE for sidelink (SL) discontinuous reception (DRX) by the RX UE for SL communication with the TX UE, wherein the first message includes one or more of a DRX configuration including, for each of one or more SL connections with one or more SL UEs or one or more network connections with one or more bae stations, one or more of a cycle duration and start offset, a slot offset, an on duration length, an inactivity timer duration, or a maximum duration of active timer or a radio frequency (RF) capability of the RX UE including one or more of a number of simultaneous RF chains, a number of beams configured for DRX, angular separations of beams configured for DRX, or power leakage values.

At block 1110, the method 1100 may transmit, to the RX UE, a second message including a RX UE DRX configuration based on at least one of the DRX configuration or the RF capability indicated in the first message. For example, the communication component 322, the transceiver 302, the receiver 306, the transmitter 308, the RF front end 388, the subcomponents of the RF front end 388, the processor 312, the memory 316, the modem 320, and/or the applications 375 of the BS 105 may transmit, to the RX UE, a second message including a RX UE DRX configuration based on at least one of the DRX configuration or the RF capability indicated in the first message as described above. The communication component 222 may send the digital signals to the transceiver 202 or the transmitter 208. The transceiver 202 or the transmitter 208 may convert the digital signals to electrical signals and send to the RF front end 288. The RF front end 288 may filter and/or amplify the electrical signals. The RF front end 288 may send the electrical signals as electro-magnetic signals via the one or more antennas 265.

In certain implementations, the communication component 322, the transceiver 302, the receiver 306, the transmitter 308, the RF front end 388, the subcomponents of the RF front end 388, the processor 312, the memory 316, the modem 320, and/or the applications 375 may be configured to and/or may define means for transmitting, to the RX UE, a second message including a RX UE DRX configuration based on at least one of the DRX configuration or the RF capability indicated in the first message.

ADDITIONAL IMPLEMENTATIONS

Aspects of the present disclosure include methods by a user equipment (UE) for transmitting a first message to a transmitting (TX) UE for discontinuous reception (DRX) by the RX UE for sidelink (SL) communication with the TX UE, wherein the first message includes wherein the first message includes a DRX configuration including, for each of one or more SL connections or one or more network connections, one or more of a cycle duration and start offset, a slot offset, an on duration length, an inactivity timer duration, or a maximum duration of active timer and a radio frequency (RF) capability of the RX UE including one or more of a number of simultaneous RF chains, a number of beams configured for DRX, angular separations of beams configured for DRX, or power leakage values.

Any of the methods above, wherein the first message further includes an indication of priority among the DRX and one or more SL DRX with one or more SL UEs.

Any of the methods above, wherein the first message further includes an indication of priority among the DRX and one or more receptions from the TX UE.

Any of the methods above, further comprising establishing a new connection with a SL UE or a network after transmitting the first message, and transmitting an update message indicating a first update to the DRX configuration or a second update to the RF capability in response to establishing the new connection.

Any of the methods above, further comprising establishing a SL connection of the one or more SL connections or a network connection of the one or more network connections, and indicating a preference in the first message for the DRX for the SL communication based on the SL connection or the network connection.

Any of the methods above, wherein the preference includes aligning the DRX of the SL communication with a previously established DRX of the SL connection or the network connection.

Any of the methods above, further comprising receiving, in response to transmitting the first message, a second message including a current DRX configuration for the SL communication with the TX UE, wherein the current DRX configuration includes one or more of a current cycle duration and start offset value, a current slot offset value, a current on duration length value, a current inactivity timer duration value, or a current maximum duration of active timer value.

Other aspects of the present disclosure include a user equipment (UE) having a memory comprising instructions, a transceiver, and one or more processors operatively coupled with the memory and the transceiver, the one or more processors configured to execute instructions in the memory to transmit a first message to a transmitting (TX) UE for discontinuous reception (DRX) by the RX UE for sidelink (SL) communication with the TX UE, wherein the first message includes a DRX configuration including, for each of one or more SL connections or one or more network connections, one or more of a cycle duration and start offset, a slot offset, an on duration length, an inactivity timer duration, or a maximum duration of active timer and a radio frequency (RF) capability of the RX UE including one or more of a number of simultaneous RF chains, a number of beams configured for DRX, angular separations of beams configured for DRX, or power leakage values.

Any of the UEs above, wherein the first message further includes an indication of priority among the DRX and one or more SL DRX with one or more SL UEs.

Any of the UEs above, wherein the first message further includes an indication of priority among the DRX and one or more receptions from the TX UE.

Any of the UEs above, wherein the one or more processors are further configured to establish a new connection with a SL UE or a network after transmitting the first message, and transmit an update message indicating a first update to the DRX configuration or a second update to the RF capability in response to establishing the new connection.

Any of the UEs above, wherein the one or more processors are further configured to establish a SL connection of the one or more SL connections or a network connection of the one or more network connections, and indicate a preference in the first message for the DRX for the SL communication based on the SL connection or the network connection.

Any of the UEs above, wherein the preference includes aligning the DRX of the SL communication with a previously established DRX of the SL connection or the network connection.

Any of the UEs above, wherein the one or more processors are further configured to receive in response to transmitting the first message, a second message including a current DRX configuration for the SL communication with the TX UE, wherein the current DRX configuration includes one or more of a current cycle duration and start offset value, a current slot offset value, a current on duration length value, a current inactivity timer duration value, or a current maximum duration of active timer value.

An aspect of the present disclosure includes a user equipment (UE) including means for transmitting a first message to a transmitting (TX) UE for discontinuous reception (DRX) by the RX UE for sidelink (SL) communication with the TX UE, wherein the first message includes a DRX configuration including, for each of one or more SL connections or one or more network connections, one or more of a cycle duration and start offset, a slot offset, an on duration length, an inactivity timer duration, or a maximum duration of active timer and a radio frequency (RF) capability of the RX UE including one or more of a number of simultaneous RF chains, a number of beams configured for DRX, angular separations of beams configured for DRX, or power leakage values.

Any of the UEs above, wherein the first message further includes an indication of priority among the DRX and one or more SL DRX with one or more SL UEs.

Any of the UEs above, wherein the first message further includes an indication of priority among the DRX and one or more receptions from the TX UE.

Any of the UEs above, further comprising means for establishing a new connection with a SL UE or a network after transmitting the first message, and means for transmitting an update message indicating a first update to the DRX configuration or a second update to the RF capability in response to establishing the new connection.

Any of the UEs above, further comprising means for establishing a SL connection of the one or more SL connections or a network connection of the one or more network connections, and means for indicating a preference in the first message for the DRX for the SL communication based on the SL connection or the network connection.

Any of the UEs above, wherein the preference includes aligning the DRX of the SL communication with a previously established DRX of the SL connection or the network connection.

Any of the UEs above, further comprising means for receiving, in response to transmitting the first message, a second message including a current DRX configuration for the SL communication with the TX UE, wherein the current DRX configuration includes one or more of a current cycle duration and start offset value, a current slot offset value, a current on duration length value, a current inactivity timer duration value, or a current maximum duration of active timer value.

Some aspects of the present disclosure include non-transitory computer readable media having instructions stored therein that, when executed by one or more processors of a user equipment (UE), cause the one or more processors to transmit a first message to a transmitting (TX) UE for discontinuous reception (DRX) by the RX UE for sidelink (SL) communication with the TX UE, wherein the first message includes a DRX configuration including, for each of one or more SL connections or one or more network connections, one or more of a cycle duration and start offset, a slot offset, an on duration length, an inactivity timer duration, or a maximum duration of active timer and a radio frequency (RF) capability of the RX UE including one or more of a number of simultaneous RF chains, a number of beams configured for DRX, angular separations of beams configured for DRX, or power leakage values.

Any of the non-transitory computer readable media above, wherein the first message further includes an indication of priority among the DRX and one or more SL DRX with one or more SL UEs.

Any of the non-transitory computer readable media above, wherein the first message further includes an indication of priority among the DRX and one or more receptions from the TX UE.

Any of the non-transitory computer readable media above, wherein establish a new connection with a SL UE or a network after transmitting the first message, and transmit an update message indicating a first update to the DRX configuration or a second update to the RF capability in response to establishing the new connection.

Any of the non-transitory computer readable media above, further comprising instructions, when executed by the one or more processors, cause the one or more processors to establish a SL connection of the one or more SL connections or a network connection of the one or more network connections, and indicate a preference in the first message for the DRX for the SL communication based on the SL connection or the network connection.

Any of the non-transitory computer readable media above, wherein the preference includes aligning the DRX of the SL communication with a previously established DRX of the SL connection or the network connection.

Any of the non-transitory computer readable media above, further comprising instructions, when executed by the one or more processors, cause the one or more processors to receive in response to transmitting the first message, a second message including a current DRX configuration for the SL communication with the TX UE, wherein the current DRX configuration includes one or more of a current cycle duration and start offset value, a current slot offset value, a current on duration length value, a current inactivity timer duration value, or a current maximum duration of active timer value.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. For example, changes may be made in the function and arrangement of elements discussed without departing from the scope of the disclosure. Also, various examples may omit, substitute, or add various procedures or components as appropriate. For instance, the methods described may be performed in an order different from that described, and various steps may be added, omitted, or combined. Also, features described with respect to some examples may be combined in other examples. In some instances, well-known structures and apparatuses are shown in block diagram form in order to avoid obscuring the concepts of the described examples.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description herein, however, describes an LTE/LTE-A system or 5G system for purposes of example, and LTE terminology is used in much of the description below, although the techniques may be applicable other next generation communication systems.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method of wireless communication by a receiving (RX) user equipment (UE), comprising:
   transmitting a first message to a transmitting (TX) UE for sidelink (SL) discontinuous reception (DRX) by the RX UE for SL communication with the TX UE, wherein the first message includes:
      a DRX configuration including, for each of one or more SL connections with one or more SL UEs or one or more network connections with one or more base stations, one or more of a cycle duration and start offset, a slot offset, an on duration length, an inactivity timer duration, or a maximum duration of active timer;
      a radio frequency (RF) capability of the RX UE including one or more of a number of simultaneous RF chains, receive beams configured for DRX, angular separations of receive beams configured for DRX, or power leakage values; and
      an indication of priority among the TX UE and the one or more SL UEs; and
   receiving, in response to transmitting the first message, a second message including a DRX configuration for the SL communication with the TX UE, wherein the second message indicates a complete temporal offset between the DRX of the SL communication and a DRX of a SL connection of the one or more SL connections or a network connection of the one or more network connections.

2. The method of claim 1, wherein:
   the first message further includes a second indication of priority among the SL DRX and one or more SL DRX with the one or more SL UEs.

3. The method of claim 1, further comprising:
   establishing a new connection with a SL UE or a network after transmitting the first message; and
   transmitting an update message indicating a first update to the SL DRX configuration or a second update to the RF capability in response to establishing the new connection.

4. The method of claim 1, further comprising:
   establishing the SL connection of the one or more SL connections or the network connection of the one or more network connections; and
   indicating a preference in the first message for the DRX for the SL communication based on the SL connection or the network connection.

5. The method of claim 4, wherein:
   the preference includes aligning the DRX of the SL communication with a previously established DRX of the SL connection or the network connection.

6. The method of claim 1,
   wherein the DRX configuration for the SL communication with the TX UE includes one or more of a current cycle duration and start offset value, a current slot offset value, a current on duration length value, a current inactivity timer duration value, or a current maximum duration of active timer value.

7. A receiving (RX) user equipment (UE), comprising:
   memory comprising instructions;
   a transceiver; and
   one or more processors operatively coupled with the memory and the transceiver, the one or more processors configured to execute instructions in the memory to:
   transmit a first message to a transmitting (TX) UE for sidelink (SL) discontinuous reception (DRX) by the RX UE for SL communication with the TX UE, wherein the first message includes:
      a DRX configuration including, for each of one or more SL connections with one or more SL UEs or one or more network connections with one or more base stations, one or more of a cycle duration and start offset, a slot offset, an on duration length, an inactivity timer duration, or a maximum duration of active timer;
      a radio frequency (RF) capability of the RX UE including one or more of a number of simultaneous RF chains, a number of beams configured for DRX, angular separations of beams configured for DRX, or power leakage values; and
      an indication of priority among the TX UE and the one or more SL UEs; and
   receive, in response to transmitting the first message, a second message including a DRX configuration for the SL communication with the TX UE, wherein the second message indicates a complete temporal offset between the DRX of the SL communication and a DRX of a SL connection of the one or more SL connections or a network connection of the one or more network connections.

8. The UE of claim 7, wherein:
   the first message further includes a second indication of priority among the SL DRX and one or more SL DRX with the one or more SL UEs.

9. The UE of claim 7, wherein the one or more processors are further configured to:
   establish a new connection with a SL UE or a network after transmitting the first message; and
   transmit an update message indicating a first update to the SL DRX configuration or a second update to the RF capability in response to establishing the new connection.

10. The UE of claim 7, wherein the one or more processors are further configured to:
    establish the SL connection of the one or more SL connections or the network connection of the one or more network connections; and
    indicate a preference in the first message for the DRX for the SL communication based on the SL connection or the network connection.

11. The UE of claim 10, wherein:
    the preference includes aligning the DRX of the SL communication with a previously established DRX of the SL connection or the network connection.

12. The UE of claim 7,
    wherein the DRX configuration for the SL communication with the TX UE includes one or more of a current cycle duration and start offset value, a current slot offset value, a current on duration length value, a current inactivity timer duration value, or a current maximum duration of active timer value.

13. A non-transitory computer readable medium having instructions stored therein that, when executed by one or more processors of a receiving (RX) user equipment (UE), cause the one or more processors to:
  transmit a first message to a transmitting (TX) UE for sidelink (SL) discontinuous reception (DRX) by the RX UE for SL communication with the TX UE, wherein the first message includes:
    a DRX configuration including, for each of one or more SL connections with one or more SL UEs or one or more network connections with one or more base stations, one or more of a cycle duration and start offset, a slot offset, an on duration length, an inactivity timer duration, or a maximum duration of active timer;
    a radio frequency (RF) capability of the RX UE including one or more of a number of simultaneous RF chains, a number of beams configured for DRX, angular separations of beams configured for DRX, or power leakage values; and
    an indication of priority among the TX UE and the one or more SL UEs; and
  receive, in response to transmitting the first message, a second message including a DRX configuration for the SL communication with the TX UE, wherein the second message indicates a complete temporal offset between the DRX of the SL communication and a DRX of a SL connection of the one or more SL connections or a network connection of the one or more network connections.

14. The non-transitory computer readable medium of claim 13, wherein:
  the first message further includes a second indication of priority among the SL DRX and one or more SL DRX with the one or more SL UEs.

15. The non-transitory computer readable medium of claim 13, wherein:
  establish a new connection with a SL UE or a network after transmitting the first message; and
  transmit an update message indicating a first update to the SL DRX configuration or a second update to the RF capability in response to establishing the new connection.

16. The non-transitory computer readable medium of claim 13, further comprising instructions, when executed by the one or more processors, cause the one or more processors to:
  establish the SL connection of the one or more SL connections or the network connection of the one or more network connections; and
  indicate a preference in the first message for the DRX for the SL communication based on the SL connection or the network connection.

17. The non-transitory computer readable medium of claim 16, wherein:
  the preference includes aligning the DRX of the SL communication with a previously established DRX of the SL connection or the network connection.

18. The non-transitory computer readable medium of claim 13,
  wherein the DRX configuration for the SL communication with the TX UE includes one or more of a current cycle duration and start offset value, a current slot offset value, a current on duration length value, a current inactivity timer duration value, or a current maximum duration of active timer value.

19. A receiving (RX) user equipment (UE), comprising:
  means for transmitting a first message to a transmitting (TX) UE for sidelink (SL) discontinuous reception (DRX) by the RX UE for SL communication with the TX UE, wherein the first message includes:
    a DRX configuration including, for each of one or more SL connections with one or more SL UEs or one or more network connections with one or more base stations, one or more of a cycle duration and start offset, a slot offset, an on duration length, an inactivity timer duration, or a maximum duration of active timer;
    a radio frequency (RF) capability of the RX UE including one or more of a number of simultaneous RF chains, a number of beams configured for DRX, angular separations of beams configured for DRX, or power leakage values; and
    an indication of priority among the TX UE and the one or more SL UEs; and
  means for receiving, in response to transmitting the first message, a second message including a DRX configuration for the SL communication with the TX UE, wherein the second message indicates a complete temporal offset between the DRX of the SL communication and a DRX of a SL connection of the one or more SL connections or a network connection of the one or more network connections.

20. The UE of claim 19, wherein:
  the first message further includes a second indication of priority among the SL DRX and one or more SL DRX with the one or more SL UEs.

21. The UE of claim 19, further comprising:
  means for establishing a new connection with a SL UE or a network after transmitting the first message; and
  means for transmitting an update message indicating a first update to the SL DRX configuration or a second update to the RF capability in response to establishing the SL connection or the network connection.

22. The UE of claim 19, further comprising:
  means for establishing the SL connection of the one or more SL connections or the network connection of the one or more network connections; and
  means for indicating a preference in the first message for the DRX for the SL communication based on the SL connection or the network connection.

23. The UE of claim 22, wherein:
  the preference includes aligning the DRX of the SL communication with a previously established DRX of the SL connection or the network connection.

24. The UE of claim 19,
  wherein the DRX configuration for the SL communication with the TX UE includes one or more of a current cycle duration and start offset value, a current slot offset value, a current on duration length value, a current inactivity timer duration value, or a current maximum duration of active timer value.

* * * * *